UNITED STATES PATENT OFFICE 2,004,310

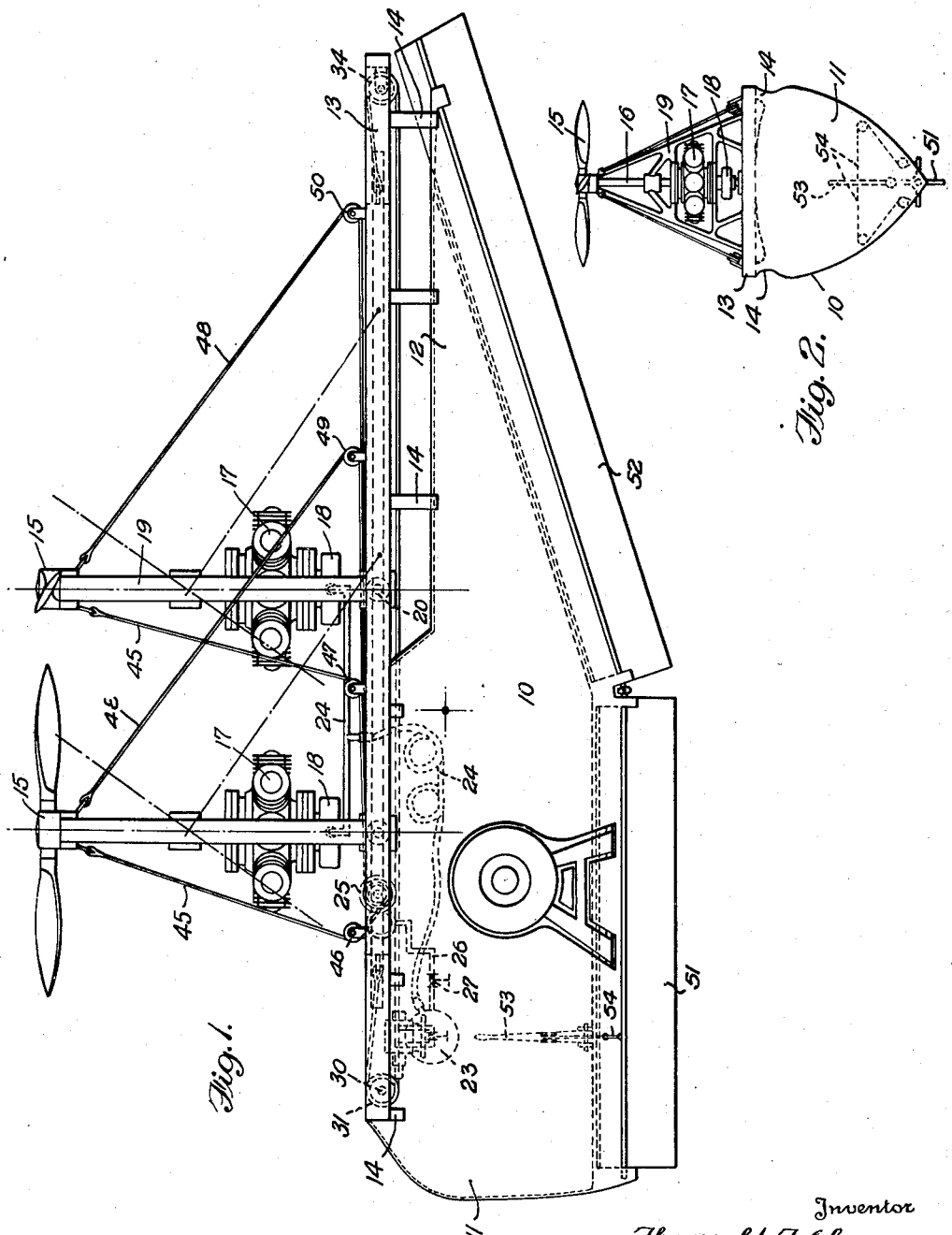

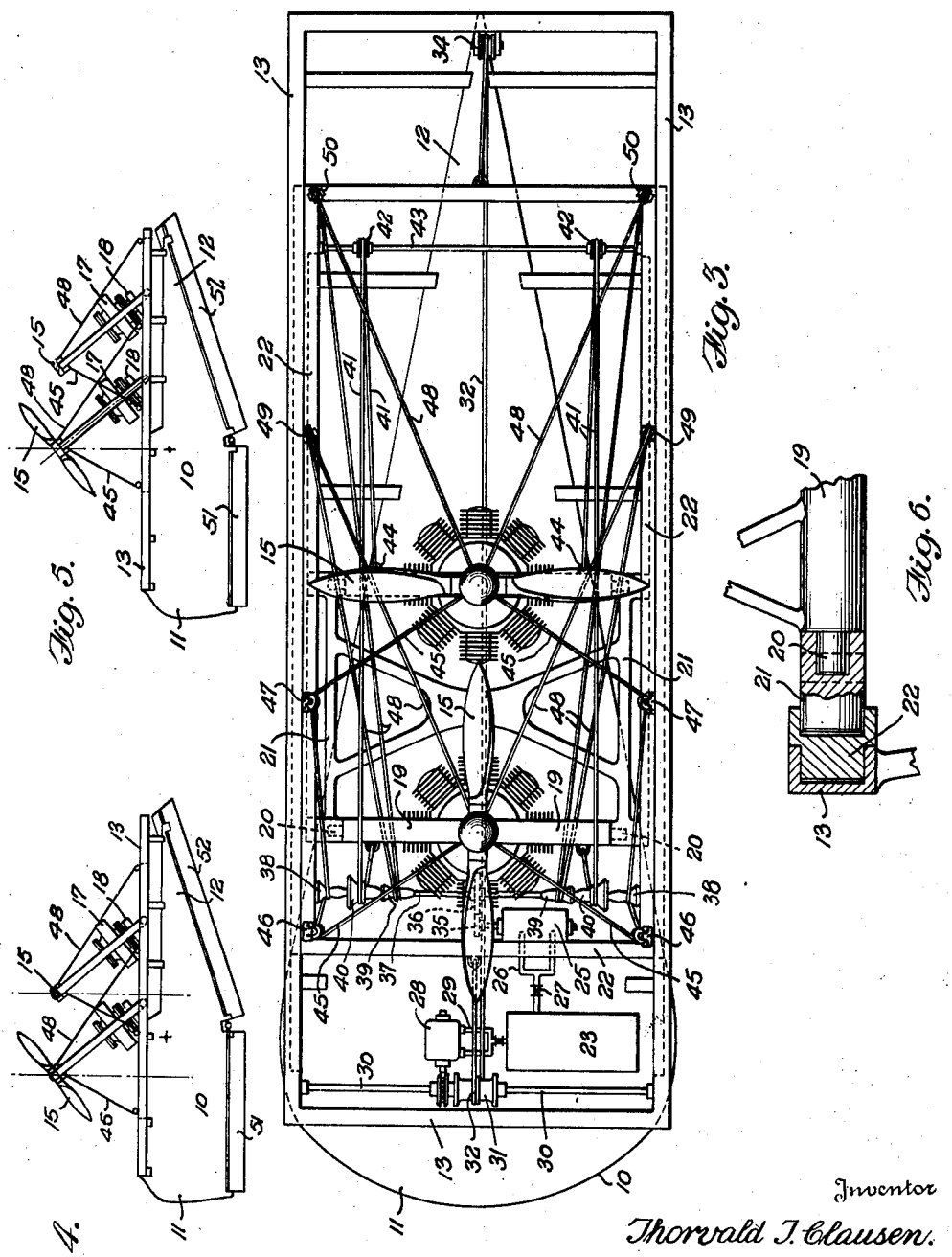

HELICOPTER

Thorvald T. Clausen, Seattle, Wash.

Application June 27, 1933, Serial No. 677,899

11 Claims. (Cl. 244—19)

The invention relates to improvements in flying machines, and more particularly to a device of the heavier-than-air type operating on the helicopter principle, and capable of functioning without the usual wings or planes.

Among the objects of the invention are to provide a flying machine which is capable of rising or landing vertically, which can hover in mid-air, and which is capable of operating either at very high or very low speeds. Such a machine, used without wings, will be capable of landing in small or narrow places, such as house-tops, or in rooms, thus avoiding the necessity of landing fields.

According to my invention, the flying machine is provided with propellers whose direction of thrust is capable of variation, while at the same time the centers of lift of the propellers remain in fixed relation to the center of gravity of the fuselage, thereby maintaining the balance of the fuselage. In all previous devices of this general character, so far as I am aware, the shifting of the direction of thrust was accompanied by a shifting of the centers of lift of the propellers, thus throwing the entire device out of balance.

Another feature of my device is the provision of means for shifting all of the propellers and their motors longitudinally of the fuselage when one or more of the propellers are temporarily out of operation, or when one or more propellers previously out of operation are put back into service again, in order to maintain constant the composite center of lift of all the propellers in operation with respect to the center of gravity of the fuselage.

The invention will be more fully understood by reference to the accompanying drawings and the following detailed description in which is set forth for the purpose of illustration an embodiment of the invention.

In the drawings,

Fig. 1 is a side elevation largely diagrammatic in character, showing a helicopter embodying the invention;

Fig. 2 is a front elevation on a reduced scale;

Fig. 3 is a top plan view;

Fig. 4 is a diagrammatic side elevation on a reduced scale, showing the propellers tilted forward;

Fig. 5 is a view similar to Fig. 4, but showing the entire driving mechanism including the propellers, motors, etc., shifted longitudinally; and Fig. 6 is a detailed section on line 6—6 of Fig. 3, showing the hinged mounting of the propeller and motor supports on slidable frames.

The fuselage 10, as illustrated, may be termed tadpole shaped, being enlarged at the front end 11 and tapering toward the rear portion 12. The usual tiltable rear rudder, not shown, will preferably be employed for varying the direction of flight. Secured to the upper portion of the fuselage is a frame 13, rectangular in shape, rigidly attached to the fuselage by means of supports 14, see Fig. 2. No planes or wings are required in connection with an air craft of this character.

Motive power is furnished by means af a plurality of propellers 15, herein shown as two in number, each mounted upon a suitable shaft 16 and each provided with a motor 17, preferably turning in a direction opposite to that of its respective propeller in order to neutralize the torque. As shown, air compressors 18 are provided, one for each motor, which compressors may be employed for starting the motors and also for furnishing compressed air for other purposes to be hereinafter described.

According to the preferred embodiment of the invention, each propeller and its shaft, the motor for operating the same, and the compressor are carried by a frame 19, which is pivotally mounted at 20 in a longitudinally slidable frame 21. This sliding frame carries the two pivoted frames 19 with their respective propellers and motors. The sliding frame 21 is in turn carried by a second frame 22, which is likewise slidable in the fixed frame 13 mounted upon the top of the fuselage. The relation of the various frames is most clearly illustrated in Fig. 6. For actuating the various sliding and pivoted frames, any suitable operating mechanism may be employed, preferably pneumatic or electrical. In the present embodiment of the invention pneumatic means are disclosed. As shown, a storage tank 23 mounted within the fixed frame 13 is supplied with compressed air from one or both of the compressors 18 actuated by the motor 17 through flexible tubes 24, which may be provided with suitable valves. An air motor 25 is carried by the movable frame 22, and is supplied from the storage tank through flexible tubing 26 provided with a suitable valve means 27. The motor 25 is employed for operating the sliding frame 21 and for tilting the propeller shafts.

For operating the sliding frame 22 a motor 28 is provided having tubular connections 29 with the storage tank 23, including a suitable valve. The motor 28 is reversible and actuates a shaft 30 journalled in the fixed frame 13 through suitable gearing. The shaft 30 carries a drum 31 over which passes a cable 32 connected at one end to the front of the sliding frame 22 and having its other end passed over an idler pulley 34 and attached to the rear end of the sliding frame 22.

The operation of the sliding frame 21 and the pivoted frames carrying the lower ends of the propeller shafts will now be described. The reversible motor 25 drives through gears 35 and 36 a shaft 37 carrying a plurality of drums, herein shown as six in number, which are employed for winding cables attached to both ends of the frame 21 and to the upper portion of the pivoted propeller shaft frames. The drums and cables are so arranged and proportioned that rotating the shaft 37 in one direction actuates the sliding frame 21 carrying the lower portion of the propeller shafts, thus varying the angle of thrust, while the upper portion of each propeller shaft is moved vertically but not horizontally, remaining in the same vertical plane and not shifting the center of lift out of such plane. By turning the shaft in the opposite direction, the propeller shafts are straightened or moved to the vertical position again without varying the center of lift from the original vertical plane.

As shown, the shaft 37 is provided with a pair of outer drums 38, a like pair of inner drums 39 and an intermediate pair of drums 40.

The drums 40 are provided with cables 41, each attached at one end to the front end of the frame 21 and at the other end passing over an idler pulley 42 on a shaft 43 mounted in the frame 22. This other end is attached at 44 to the rear end of the frame 21. It will be noted that the arrangement is the same for each of the two drums 40. It will be obvious that by rotating the shaft 37 in either direction the frame 21 may be caused to correspondingly reciprocate with respect to the fixed frame 13.

Each outer drum actuates a cable 45. One end of each cable 45 passes over an idler pulley 46 at the front end of the frame 22 and is attached to the top of the front of pivoted frame 19 at approximately the center of thrust, the connection being made at the forward end. The other end of each cable 45 passes around a pulley 47 and is similarly connected at the front portion of the second or rear pivoted frame near the center of thrust. The two drums 38 are similar one to another and the cable connections are similar.

The two inner pulleys actuate a pair of cables 48. Each cable 48 has one end passing over an idler pulley 49 and attached at the top of the first propeller frame at the rear side thereof near the center of thrust of the propeller. The other end of each cable passes over an idler pulley 50 and thence to the rear end of the second or rear tiltable frame, where it is attached to the upper portion thereof adjacent the center of thrust of the propeller.

Rudders or fins 51, 52 may be provided at the lower portion of the fuselage. These may be tilted by means of a pivoted stick 53 operated through a suitable cable 54, as illustrated particularly in Fig. 2 of the drawings. The usual rear rudder may be employed in addition, if desired. A retractable landing gear is indicated at 55.

Operation

With the propellers in the position indicated in full lines in Fig. 1, with their shafts substantially vertical and the center of thrust of the two propellers being removed substantially equal distances in a horizontal plane from the center of gravity of the air-craft, the motors 17 are started and the machine will rise vertically. During this period the compressors 18 may be operated by the motors 17 to restore compressed air within the storage tank 23. To vary the angle of thrust of the propellers, the air motor 25 is operated, causing the shaft 37 to rotate together with the drums 38, 39 and 40. The drums 40 and cables 41 will draw the frame 21 rearwardly, carrying with it the lower portion of the propeller shaft, together with the motors, compressors, etc. The drums 38 and 39, together with their respective cables, are so proportioned with respect to the drums 40 as to hold the centers of thrust of each of the propellers in their original vertical planes, as indicated in dotted lines in Fig. 1 and in full lines in Fig. 4. When in this position the air-craft will be moved rapidly forward by the propellers, owing to the component of force in the forward direction, while at the same time the weight of the craft will be sustained by the upward or lifting component of force. By reversing the motor 25 the propeller shafts may be restored to the vertical position for landing, hovering, etc. Obviously the propeller shafts may be maintained at any desired angle, the two positions shown in Figs. 1 and 4 being given for the purpose of illustration.

In the event that one of the motors should go dead or one of the propellers become inoperative for any reason, the craft may function with the remaining propeller or propellers, where more than two were originally employed. This may be accomplished by operating the motor 28 in the proper direction to draw the frame 22 to the front or rear, as required in order to place the center of thrust of the remaining propeller or propellers directly over the center of gravity. Where more than two motors are employed, the composite center of thrust of the motors remaining in operation should be directly above the center of gravity. In Fig. 5 it is assumed that the rear motor is dead, and consequently the center of thrust of the front propeller has been moved to a position where it is directly over the center of gravity of the craft indicated by X. This position is to be contrasted with the position shown in Figs. 1 and 4, wherein the centers of thrust are equally removed from the center of gravity.

The invention has been described in detail for the purpose of illustration, but it will be obvious that many of such details may be varied without departing from the spirit of the invention. The important feature of the invention is the maintaining of the balance of the entire craft during such time as the direction of thrust may be varied.

What I claim is:

1. In a helicopter, a longitudinally shiftable frame, a plurality of upright frames hingedly mounted at their lower ends in said longitudinally shiftable frame, and propellers, propeller shafts and motors mounted in said hinged frames, and means for maintaining the centers of the propellers in the same vertical planes during movement of the hinged frames.

2. In a helicopter, a longitudinally shiftable frame, an upright frame hinged at its lower end in said shiftable frame, a propeller, propeller shaft and motor carried by the frame, means for reciprocating the longitudinally shiftable frame, and means for preventing movement of the center of the propeller in a horizontal plane during such reciprocation.

3. In a helicopter, a longitudinally shiftable frame, a plurality of upright frames hingedly mounted at their lower ends in said longitudinally shiftable frame, and propellers, propeller shafts and motors mounted in said hinged frames, means for maintaining the centers of the propellers in the same vertical planes during movement of the hinged frames, and a second longitudinally movable frame carrying the first longitudinally movable frame and said last-named means, whereby the entire mechanism may be shifted as a safety factor when one of the propelling units is rendered inoperative.

4. In a helicopter, a horizontally slidable frame, actuating means therefor, a plurality of frames hingedly mounted in the slidable frame, each of the frames carrying a propeller projecting from its apex, with the propeller shaft and a motor for driving the same mounted between the sides thereof, means for maintaining the centers of said propellers in the same vertical plane as the frames are tilted, and a second longitudinally movable frame carrying the first-mentioned movable frame and said last-named means, whereby the entire mechanism may be shifted as a safety factor when one of the propelling units is rendered inoperative.

5. In a helicopter, a longitudinally shiftable frame, a plurality of upright frames hingedly mounted at their lower ends in said longitudinally shiftable frame, and propellers, propeller shafts and motors mounted in said hinged frames, means for maintaining the centers of the propellers in the same vertical planes during movement of the hinged frames, and a second longitudinally movable frame carrying the first longitudinally movable frame and said last-named means, whereby the entire mechanism may be shifted as a safety factor when one of the propelling units is rendered inoperative, air compressors actuated by said motors, a compressed air storage tank communicating with said compressors, and means operated by compressed air from said tank for actuating said frames.

6. In a helicopter, a longitudinally movable frame, an upright frame hingedly mounted at its lower end in said longitudinally movable frame, a propeller and propeller shaft carried by said hinged frame, and means for maintaining the top of the hinged frame in the same transverse vertical plane as the lower end is shifted fore and aft.

7. In a helicopter, a propeller having a propeller shaft, means for varying the angle of thrust of the propeller by tilting the propeller shaft while maintaining the lower end thereof in a horizontal plane, and means for preventing fore and aft movement of the propeller itself as the angle of thrust is varied.

8. A helicopter as set forth in claim 7, wherein the propeller moves vertically as its shaft is tilted.

9. In a helicopter, a propeller and a propeller shaft, means for shifting the lower end of the propeller shaft fore and aft in a horizontal plane, and means for maintaining the propeller itself substantially without movement horizontally during the shifting operation.

10. In a helicopter, a plurality of propellers, each having a propeller shaft and motor, a plurality of pivoted frames, each carrying a propeller shaft and motor, means for shifting the lower ends of all of said frames fore and aft in a horizontal plane, and means for preventing movement of said propellers horizontally during the shifting operation.

11. In a helicopter, a horizontally movable frame, a plurality of propellers having shafts pivotally carried by said frame, means for shifting the frame to cause a tilting of the pivoted shafts, and means for maintaining the centers of the propellers in the same transverse vertical planes as the frame is shifted.

THORVALD T. CLAUSEN.